US009676251B2

United States Patent
Yokoyama et al.

(10) Patent No.: US 9,676,251 B2
(45) Date of Patent: Jun. 13, 2017

(54) HEATING DEVICE AND METHOD FOR MANUFACTURING HEATING DEVICE

(71) Applicant: Sanden Corporation, Isesaki-shi, Gunma (JP)

(72) Inventors: Hiroyuki Yokoyama, Isesaki (JP); Yusuke Sakai, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 187 days.

(21) Appl. No.: 14/408,545

(22) PCT Filed: Jul. 2, 2013

(86) PCT No.: PCT/JP2013/004103
§ 371 (c)(1),
(2) Date: Dec. 16, 2014

(87) PCT Pub. No.: WO2014/013684
PCT Pub. Date: Jan. 23, 2014

(65) Prior Publication Data
US 2015/0139633 A1    May 21, 2015

(30) Foreign Application Priority Data

Jul. 18, 2012 (JP) ................. 2012-159455

(51) Int. Cl.
*F24H 1/10* (2006.01)
*H05B 3/78* (2006.01)
(Continued)

(52) U.S. Cl.
CPC ........... *B60H 1/2221* (2013.01); *F24H 1/009* (2013.01); *F24H 1/102* (2013.01); *F24H 1/103* (2013.01);
(Continued)

(58) Field of Classification Search
None
See application file for complete search history.

(56) References Cited

U.S. PATENT DOCUMENTS 941,215 A * 11/1909 Wade ..................... F24H 1/121
122/4 A
1,215,748 A * 2/1917 Underwood ............ F24H 1/102
392/479

(Continued)

FOREIGN PATENT DOCUMENTS

JP    S08-016435 Y1    10/1933
JP    2002-087051 A    3/2002
(Continued)

OTHER PUBLICATIONS

Japan Patent Office; Office Action issued for Japanese Patent Application No. 2012-159455, mailed May 10, 2016.
(Continued)

*Primary Examiner* — Thor Campbell
(74) *Attorney, Agent, or Firm* — Baker Botts L.L.P.

(57) ABSTRACT

Provided is a heating device which is capable of smoothening flow of a heat medium while reducing a processing time of a case. A heating device 1 is constituted of a case 2 including therein a flow path 3 through which a heat medium flows, and electric heating wire heaters 4 arranged in the flow path 3 of the case 2 to heat the heat medium. The case 2 is constituted of a first case section 6 and a second case section 7 each of which has at least one opened surface and which are connected to each other in a state where respective openings 6A and 7A are made to abut on each other. The respective case sections 6 and 7 are formed by casting of a metal.

8 Claims, 3 Drawing Sheets

(51) Int. Cl.
- *B60H 1/22* (2006.01)
- *H05B 3/24* (2006.01)
- *H05B 3/04* (2006.01)
- *F24H 1/00* (2006.01)
- *F24H 9/00* (2006.01)
- *F24H 9/14* (2006.01)

(52) U.S. Cl.
CPC ........... *F24H 9/0015* (2013.01); *F24H 9/146* (2013.01); *H05B 3/04* (2013.01); *H05B 3/24* (2013.01); *B60H 2001/2271* (2013.01); *B60H 2001/2278* (2013.01); *H05B 2203/014* (2013.01); *H05B 2203/022* (2013.01); *Y10T 29/49387* (2015.01)

(56) References Cited

U.S. PATENT DOCUMENTS

| | | | | |
|---|---|---|---|---|
| 2,640,138 | A * | 5/1953 | Merritt | F02N 19/10 123/142.5 E |
| 3,262,570 | A * | 7/1966 | Borsetti | B01D 29/58 210/266 |
| 3,863,021 | A * | 1/1975 | Schindler | H02G 3/085 174/53 |
| 4,201,360 | A * | 5/1980 | Schwartzburg | B29C 45/44 249/140 |
| 4,334,141 | A * | 6/1982 | Roller | A47J 31/545 219/505 |
| 4,343,988 | A * | 8/1982 | Roller | A47J 31/545 165/165 |
| 4,395,618 | A * | 7/1983 | Cunningham | H05B 3/82 165/160 |
| 5,438,642 | A * | 8/1995 | Posen | F24H 1/102 122/19.1 |
| 5,549,821 | A * | 8/1996 | Bounnakhom | B01D 27/06 210/232 |
| 6,330,395 | B1 * | 12/2001 | Wu | F24H 1/14 392/484 |
| 6,419,476 | B1 * | 7/2002 | Ouellette | B29C 45/27 425/567 |
| 6,621,984 | B2 * | 9/2003 | Castaneda | F24H 1/142 392/465 |
| 6,816,670 | B1 * | 11/2004 | Renau | F24H 1/121 392/467 |
| 6,893,561 | B2 * | 5/2005 | Jainek | B01D 29/21 148/549 |
| 6,957,013 | B2 * | 10/2005 | Zimmer | B01D 1/0017 392/397 |
| 7,015,437 | B2 * | 3/2006 | Johnston | F24H 1/162 219/653 |
| 7,088,915 | B1 * | 8/2006 | Sturm | F24H 1/102 392/465 |
| 7,668,444 | B2 * | 2/2010 | Tsai | H05B 3/44 392/407 |
| 7,813,628 | B2 * | 10/2010 | Haan | F22B 1/288 392/397 |
| 8,107,803 | B1 * | 1/2012 | Hannah | A47J 31/4403 392/432 |
| 8,249,437 | B2 * | 8/2012 | Commette | F24H 1/102 29/432 |
| 8,731,386 | B2 * | 5/2014 | Waechter | F24H 1/009 392/479 |
| 9,062,894 | B2 * | 6/2015 | Miyazaki | F24H 1/142 |
| 2007/0102421 | A1 * | 5/2007 | Tonomura | H05B 6/02 219/630 |
| 2007/0241100 | A1 * | 10/2007 | Stickel | A47J 31/545 219/543 |
| 2010/0296800 | A1 * | 11/2010 | Min | F24H 1/121 392/468 |

FOREIGN PATENT DOCUMENTS

| | | |
|---|---|---|
| JP | 2003144257 A | 5/2003 |
| JP | 2009-156507 A | 7/2009 |
| JP | 2009243335 A | 10/2009 |
| JP | 2011-143781 A | 7/2011 |
| JP | 2012131331 A | 7/2012 |

OTHER PUBLICATIONS

The State Intellectual Property Office of People's Republic of China, The First Office Action issued in Application No. CN 201380038105.X, mailed Jul. 29, 2016.

* cited by examiner

HEATING DEVICE AND METHOD FOR MANUFACTURING HEATING DEVICE

CROSS-REFERENCE TO RELATED APPLICATIONS

This application is a U.S. National Stage Patent Application under 37 U.S.C. § 371 of International Patent Application No. PCT/JP2013/004103, filed on Jul. 2, 2013, which claims the benefit of Japanese Patent Application No. JP 2012-159455, filed on Jul. 18, 2012, the disclosures of which are incorporated herein by reference in their entirety.

TECHNICAL FIELD

The present invention relates to a heating device which heats a heat medium flowing therethrough by use of a heating element, and a method for manufacturing the heating device.

BACKGROUND ART

Due to actualization of environmental problems of recent years, development of hybrid cars and electric cars has been activated and spread thereof has been promoted. In each of such vehicles, waste heat of an engine which has heretofore been used for air condition in the vehicle cannot sufficiently be utilized. Therefore, a heating device using an electric heating wire heater as a heating element is mounted in the vehicle, and the heating device is used as an auxiliary heat source to compensate for the waste heat of the engine in the hybrid car, or used as a substitute heat source in place of the engine in the electric car, to heat a heat medium such as cooling water which flows through a circuit of an air conditioning device for the vehicle (e.g., see Patent Document 1).

In such a heating device, a flow path through which the heat medium flows is constituted in a case, and the heating element is disposed in this flow path to heat the heat medium. Therefore, heat exchange between the heating element and the heat medium has to be activated to improve a heating performance.

To solve the problem, in Patent Document 1 described above, the heating device is contrived so that a guide is formed in an outer surface of a first case body in which the heating element is received, and the flow of the heat medium in the flow path is turned by this partition wall, to lengthen a period of time when the heat exchange between the heating element, and the heat medium is performed via the first case body. In addition, it has been suggested that a meandering cooling water passage is formed in a casing, a heater is disposed in this passage in a meandering manner, and further on a wall of the cooling water passage, a plurality of convex portions are alternately formed to impose restrictions on flow of a heat medium, whereby heat exchange between the heat medium and the heater is performed (e.g., see Patent Document 2),

CITATION LIST

Patent Documents

Patent Document 1: Japanese Patent Application Publication No. 2011-143781
Patent Document 2: Japanese Patent Application Publication No. 2002-87051

SUMMARY OF THE INVENTION

Problems to be Solved by the Invention

However, in such a structure of Patent Document 1 as described above, a first case body and a casing are formed into a complicated shape, which causes the problem that time and the number of components required for mold forming and cutting increase and production cost noticeably rises. Furthermore, when a water path becomes complicated to promote heat exchange among a heating element and a heater and a heat medium, a pressure loss enlarges, a flow rate decreases, and temperatures of the heating element and the heater disadvantageously abnormally rise sometimes. Conversely, when such a shape as to smoothen flow of the heat medium is formed, it is also necessary to perform cutting for the purpose of enlarging a width of a flow path, or the like in a conventional case structure, which causes the problem that the cost further increases.

The present invention has been developed to solve such a conventional technical problem, and an object thereof is to provide a heating device which is capable of smoothening flow of a heat medium while reducing a processing time of a case, and a manufacturing method of the heating device.

Means for Solving the Problems

To achieve the above object, a heating device of the present invention is constituted of a case including therein a flow path through which a heat medium flows, and heating elements arranged in the flow path of this case to heat the heat medium, and characterized in that the case is constituted of a first case section and a second case section each of which has at least one opened surface and which are connected to each other in a state where respective openings are made to abut on each other.

The heating device of the invention of claim 2 is characterized in that in the above invention, the respective case sections are formed by casting of a metal or injection molding of a resin.

The heating device of the invention of claim 3 is characterized in that in the above invention, each of the case sections has a draft angle of a casting mold or a forming mold enlarged toward the opening, and enlarged-width portions of the flow path are formed by using the respective draft angles in the state where the openings of the respective case sections are made to abut on each other.

The heating device of the invention of claim 4 is characterized in that in the above invention, an inflow port and an outflow port of the heat medium are arranged side by side in the case, and these inflow port and outflow port face the enlarged-width portions.

The heating device of the invention of claim 5 is characterized in that in the above respective inventions, the heating elements are arranged along a space between both the case sections.

The heating device of the invention of claim 6 is characterized in that in the above respective inventions, the heat medium is a cooling water, an antifreezing solution, or an LLC for use in a vehicle air conditioning device of a hybrid car or an electric car.

The heating device of the invention of claim 7 is characterized in that in the invention of claim 1 to claim 5, the heat medium is an antifreezing solution which flows through a heating circuit.

The invention of claim 8 is a method for manufacturing a heating device constituted of a case including therein a flow path through which a heat medium flows, and heating elements arranged in the flow path of this case to heat the heat medium, characterized by comprising: forming, by casting of a metal or injection molding of a resin, a first case section and a second case section each of which has at least one opened surface and has a draft angle of a casting mold or a forming mold toward an opening; and connecting the respective case sections in a state where the openings are made to abut on each other, to form the case, and forming enlarged-width portions of the flow path by use of the draft angles of the case sections, respectively.

Advantageous Effect of the Invention

According to the present invention, in a heating device constituted of a case including therein a flow path through which a heat medium flows, and heating elements arranged in the flow path of this case to heat the heat medium, the case is constituted of a first case section and a second case section each of which has at least one opened surface and which are connected to each other in a state where respective openings are made to abut on each other. Therefore, when the case is formed by casting of a metal or injection molding of a resin as in the invention of claim 2, a shape and a structure of a mold so manufacture the respective case sections can be simplified. Consequently, reduction of production cost can be achieved.

Particularly, when each of the case sections is provided with a draft angle of a casting mold or a forming mold enlarged toward the opening and enlarged-width portions of the flow path are formed by using the respective draft angles in the state where the openings of the respective case sections are made to abut on each other as in the invention of claim 3, the enlarged-width portions of the flow path of the heat medium are formed by utilizing the draft angle of the casting mold or the forming mold, so that the flow of the heat medium in the flow path of the case can be smoothened.

In consequence, while reducing a processing time of the case to achieve the reduction of the cost, a pressure loss of the heat medium in the case can be suppressed, a required flow rate can be acquired, and an abnormal temperature rise of each heating element can be prevented.

In this case, when an inflow port and an outflow port of the heat medium are arranged side by side in the case as in the invention of claim 4, these inflow port and outflow port are allowed to face the enlarged-width portions of the flow path formed by using the draft angle. Consequently, the heat medium which has flowed from the inflow port into the flow path of the case is allowed to smoothly make a U-turn by utilizing a shape of the enlarged-width portion enlarged toward the opening of each of the case sections made to abut on each other, and then the heat medium is allowed to flow toward the outflow port, so that decrease of the pressure loss in the flow path can effectively be realized.

In addition, at this time, when the heating elements are arranged along a space between both the case sections as in the invention of claim 5, the flow of the heat medium which flows in the flow path while making the U-turn around the enlarged-width portions changes to a flow along the heating elements, so that heat exchange between each heating element and the heat medium can smoothly be performed.

Specifically, according to the invention of claim 6, the heat medium is a cooling, water, an antifreezing solution, or an LLC for use in a vehicle air conditioning device of a hybrid car or an electric car. Furthermore, according to the invention of claim 7, the heat medium is the antifreezing solution which flows through a heating circuit.

That is, when the heating device of the invention of claim 1 to claim 5 is used as an auxiliary heat source or a substitute heat source for an engine in the hybrid car, the electric car or the like, it is possible to improve an air conditioning performance of the air conditioning device provided with a cooling water circuit or a vehicle on which the air conditioning device is mounted, and it is also possible to achieve she reduction of she cost.

According to a manufacturing method of the invention of claim 8, during manufacturing of a heating device which is constituted of a case including therein a flow path through which a heat medium flows, and heating elements arranged in the flow path of this case to heat the heat medium, a first case section and a second case section each of which has at least one opened surface and has a draft angle of a casting mold or a forming mold toward an opening are formed by casting of a metal or injection molding of a resin, the respective case sections are connected to each other in a state where the openings are made to abut on each other, to form the case, and enlarged-width portions of the flow path are formed by using the draft angles of the case sections, respectively. Therefore, a shape and structure of the mold to manufacture each case section can be simplified. In consequence, it is possible to achieve the reduction of the production cost.

In particular, each of the case sections is provided with the draft angle of the casting mold or the forming mold enlarged toward the opening, and the enlarged-width portions of the flow path are formed by using the respective draft angles in the state where the openings of the respective case sections are made to abut on each other. Therefore, the enlarged-width portions of the flow path of the heat medium are formed by utilizing the draft angle of the casting mold or the forming mold, so that the flow of the heat medium in the flow path of the case can be smoothened.

In consequence, it is possible to manufacture the heating device which is capable of suppressing the pressure loss of the heat medium in the case, acquiring a required flow rate and preventing an abnormal temperature rise of each heating element, while reducing the processing time of the case to achieve the reduction of the cost.

MODE FOR CARRYING OUT THE INVENTION

Figure 1:
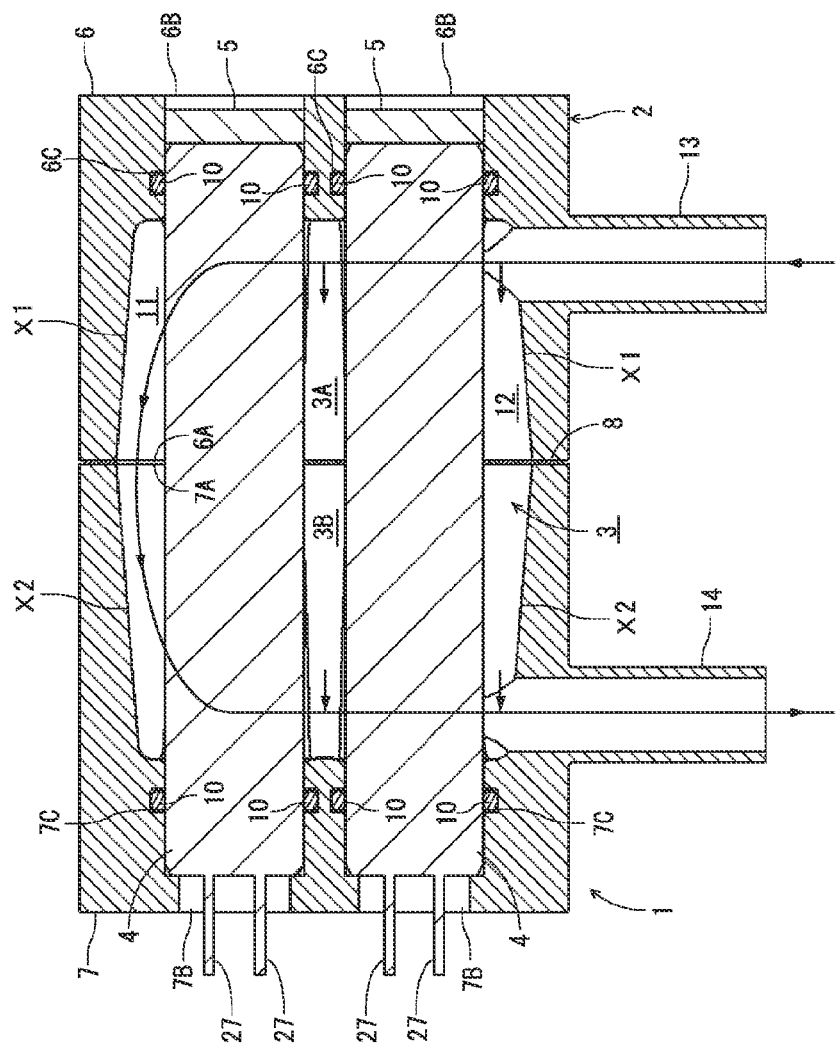
FIG. 1 is a plan sectional view of a heating device of one embodiment to which the present invention is applied.

Hereinafter, an embodiment of the present invention will be described in detail with reference to the drawings. The respective drawings show a heating device 1 of one embodiment of the present invention. The heating device 1 shown in the drawing is constituted of a case 2 in which a flow path 3 of a heat medium is formed, and two electric heating wire heaters 4 as heating elements arranged in the flow path 3 of the case 2.

The heating device 1 of the embodiment is mounted in a vehicle such as a hybrid car or an electric car, and is used as a heat source which supplies heat so as to compensate for shortage of waste heat of an engine (the heat source) in the hybrid car, or used as a substitute heat source which supplies the heat in place of the engine which is not present in the electric car, in a heating circuit of an air conditioning device for the vehicle.

Specifically, in the hybrid car, a cooling water, an antifreezing solution or an LLC flowing through a cooling water circuit to cool the engine flows as the heat medium in the flow path 3 to be heated by the electric heating wire heaters 4. This cooling water circuit is disposed in the air conditioning device for the vehicle, and heat of the LLC heated by the engine and the heating device 1 is utilized in the above air conditioning device, so that heating in the car is made possible.

Water as the heat medium is allowed to flow through the flow path 3, and the water is turned into warm water by the electric heating wire heaters 4. Consequently, this warm water may be utilized as the substitute heat source in place of the engine, i.e., the heat source to heat the cooling water, antifreezing solution, LLC or the like flowing through the heating circuit, of the air conditioning device for the vehicle.

Furthermore, it is also considered that in either one of the hybrid car and the electric car, the heating device 1 is disposed together with an unshown heater core in the heating circuit through which the antifreezing solution flows, and the heating device 1 is utilized as one of the heat sources of the antifreezing solution, to blow the air heated by the heater core.

Next, the case 2 of the heating device 1 of the embodiment is constituted of a first case section 6 and a second case section 7 each having a rectangular container form whose both side surfaces are opened and which is made of a metal, and a metal gasket 8 interposed between these sections. That is, in the first case section 6, there is formed a first flow path section 3A opened in an opening 6A of one side surface and an opening 6B of the other side surface, and also in the second case section 8, there is formed a second flow path section 3B opened in an opening 7A of one side surface and an opening 7B of the other side surface. These flow path sections 3A and 3B possess a form in which two sectionally circular passages each having an inner diameter larger than an outer diameter of each of the electric heating wire heaters 4 as much as a predetermined dimension are allowed to communicate with each other in a center only excluding the openings 6B and 7B. Therefore, the two openings 6B and the two openings 7B are formed, respectively.

Additionally, the opening 6A of the one side surface of the first case section 6 and the opening 7A of the one side surface of the second case section 7 are made to abut on each other via the gasket 8, and the respective case sections 6 and 7 are connected and fixed to each other by unshown bolts to assemble the case 2. In this state, the gasket 8 seals a space between the one side surface of the case section 6 and the one side surface of the case section 7. Additionally, the flow path 3 in the case 2 is constituted of the first flow path section 3A and the second flow path section 3B allowed to communicate in the openings 6A and 7A.

It is to be noted that the electric heating wire heaters 4 are inserted into the first flow path section 3A from the openings 6B of the other side surface of the first case section 6, respectively, and are also arranged along the second flow path section 3B of the second case section 7 in the flow path 3. In addition, terminals 27 of the electric heating wire heaters 4 are projected from the openings 7B of the other side surface of the second case section 7 to the outside.

At this time, each of the openings 7B has a diameter reduced as compared with the other portions, each of the electric heating wire heaters 4 is disposed in the flow path 3 (the flow path sections 3A and 3B) via a predetermined space, and the electric heating wire heater 4 is made to abut on a stepped portion positioned on an inner side of the reduced-diameter opening 7B on a terminal portion 24 side. Furthermore, the openings 6B are closed with covers 5, but grooves 6C and 7C are formed in sectionally circular passage inner peripheral surfaces of the respective case sections 6 and 7 on slightly inner sides of the openings 6B and 7B, and in the grooves 6C and 7C, sealing members such as O-rings 10 are disposed. Additionally, the O-rings 10 come in contact closely with outer peripheral surfaces of the electric heating wire heaters 4, and on an inner side from each of these rings, the respective flow path sections 3A and 3B in the respective case sections 6 and 7 are sealed from the side of each of the openings 6B and 7B.

Here, each of the first case section 6 and the second case section 7 constituting the case 2 is formed by casting a metal in a casting mold constituted of a casting outer mold and a casting inner mold each of which is not shown in the drawings. In this case, a draft angle X1 of the casting inner mold enlarged toward the opening 6A is formed in a distal side inner surface and a proximal side inner surface closer to the opening 6A than the grooves 6C of the first case section 6. In addition, a draft angle X2 of the casting inner mold enlarged toward the opening 7A is also formed in a distal side inner surface and a proximal side inner surface closer to the opening 7A than the grooves 7C of the second case section 7.

Figure 2:
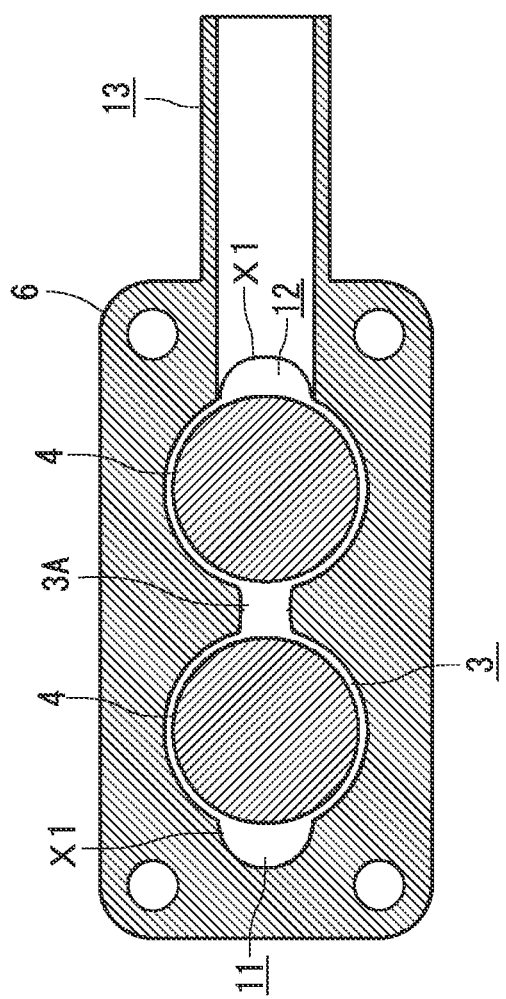
FIG. 2 is a vertically sectional side view of a first case section of the heating device of FIG. 1.

The draft angles X1 and X2 are continuous in the respective openings 6A and 7A, when the respective case sections 6 and 7 are made to abut on each other. Furthermore, on an inner side of the draft angles X1 and X2, as shown in FIG. 2, sectionally semicircular enlarged-width portions 11 and 12 are formed on the distal side and proximal side of the flow path 3, respectively. Additionally, due to such a form of each of the draft angles X1 and X2, each of the enlarged-width portions 11 and 12 has the largest form in an opening 6A and 7A portion in the vicinity of the center.

Furthermore, an inflow port 13 is formed in a proximal side surface of the first case section 6, and an outflow port 14 is formed in a proximal side surface of the second case section 7, so that these ports are arranged side by side in a state where the respective case sections 6 and 7 are connected. The inflow port 13 is positioned closer to the opening 6A than the grooves 6C to communicate with the flow path section 3A, and the outflow port 14 is positioned closer to the opening 7A than the grooves 7C to communicate with the flow path section 3B. In addition, due to such a positional relation, the inflow port 13 and the outflow port 14 face the distal-side enlarged-width portion 11.

When the heating device 1 is manufactured, first a metal material is introduced into predetermined casting outer molds and casting inner molds to solidify, thereby forming the respective case sections 6 and 7. At this time, in the respective case sections 6 and 7, the draft angles X1 and X2 of the casting inner molds enlarged toward the openings 6A and 7A are formed as described above, and hence after the forming, the casting inner molds can be removed from the casting outer molds without hindrance.

Here, two sectionally circular passages of the respective flow path sections 3A and 3B in which the electric heating wire heaters 4 are to be arranged may be smoothened by cutting, but portions of the respective, draft angles X1 and X2 are not subjected to such processing, and have cast surfaces as they are.

Next, the O-rings 10 are arranged in the respective grooves 6C and 7C. Next, the openings 6A and 7A of the respective case sections 6 and 7 are made to abut on each other and connected by bolts via the gasket 8, to complete the case 2. Next, the electric heating wire heaters 4 are inserted into the case 2 from the side of the openings 6B, and the terminals 27 and the like are projected to the outside from the opening 7A. Finally, the openings 6B are closed with the covers 5 to complete the heating device 1.

Figure 3:
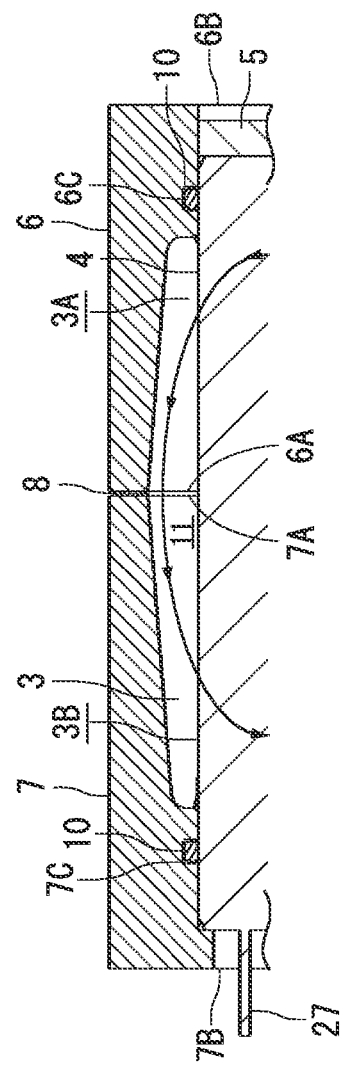
FIG. 3 is a main part enlarged view of FIG. 1.

In the abovementioned constitution, the heat medium flows from the inflow port 13 into the flow path 3 in the case 2, passes through the flow path 3 so as to make a U-turn, and flows outside from the outflow port 14 by an unshown pump or the like as shown by arrows in FIG. 1 and FIG. 3. That is, a larger part of the heat medium flowing inside from the proximal side passes around the respective electric heating wire heaters 4 in the first flow path section 3A of the first case section 6 from the proximal side to the distal side to reach the distal-side enlarged-width portion 11 due to flow energy of the heat medium. Afterward, the heat medium changes its direction toward the second case section 7 in the enlarged-width portion 11, passes around the electric heating wire heaters 4 to enter into the second flow path section 3B of the second case section 7, and flows around the respective electric heating wire heaters 4 from the distal side to the proximal side to be finally discharged from the outflow port 14.

At this time, the distal-side enlarged-width portion 11 possesses the largest form in the opening 6A and 7A portion in the vicinity of the center between the inflow port 13 and the outflow port 14, and hence the heat medium which has flowed inside from the inflow port 13 smoothly makes the U-turn by use of the shape of the enlarged-width portion 11, and flows toward the outflow port 14.

As described above, in the present invention, the case 2 of the heating device 1 is constituted of the first case section 6 and the second case section 7 each of which has at least one opened surface (6A or 7A) and which are connected to each other in a state where the respective openings 6A and 7A are made to abut on each other. Therefore, a shape and a structure of the mold to manufacture the respective case sections 6 and 7 constituting the case 2 prepared by the casting of the metal can be simplified. In consequence, the reduction of the production cost can be achieved.

In particular, the respective case sections 6 and 7 are provided with the draft angles of the casting molds enlarged toward the openings 6A and 7A, and the enlarged-width portions 11 and 12 of the flow path 3 are formed by using the respective draft angles in the state where the openings 6A and 7A of the case sections 6 and 7 are made to abut on each other. Therefore, the enlarged-width portions 11 and 12 of the flow path 3 of the heat medium can be formed by utilizing the draft angles of the casting molds, and the flow of the heat medium in the flow path of the case 2 can be smoothened.

In consequence, while reducing the processing time of the case 2 to achieve the reduction of the cost, the pressure loss of the heat medium in the case 2 can be suppressed, a required flow rate can be acquired, and an abnormal temperature rise of each of the electric heating wire heaters 4 can be prevented.

In this case, the inflow port 13 and the outflow port 14 of the heat medium are arranged side by side in the case 2, and the inflow port 13 and the outflow port 14 are allowed to face the enlarged-width portion 11 of the flow path 3 which is formed by using the draft angle. Therefore, the heat medium which has flowed from the inflow port 13 into the flow path 3 in the case 2 is allowed to smoothly make the U-turn by use of the shape of the enlarged-width portion 11 enlarged toward the openings 6A and 7A of the respective case sections 6 and 7 made to abut on each other, and is allowed to flow toward the outflow port 14, so that the decrease of the pressure loss in the flow path 3 can effectively be realized.

In addition, the electric heating wire heaters 4 are arranged along the space between both the case sections 6 and 7, and hence de flow of the heat medium flowing through the flow path 3 while making the U-turn in the enlarged-width portion 11 changes to a flow along the electric heating wire heaters 4, so that heat exchange between each of the electric heating wire heaters 4 and the heat medium can smoothly be performed.

It is to be noted that the number of the electric heating wire heaters 4 and the shape of each of the case sections 6 and 7 are not limited to those of the above embodiment. Furthermore, a heating element other than the electric heating wire heater can be applied as the heating element, and a fluid the than water may be used as the heat medium. However, when the inexpensive general-use electric heating wire heaters 4 are used, manufacturing cost of the heating device 1 can be reduced, and a reliability thereof can be improved.

Further in the embodiment, the respective case sections 6 and 7 are formed by the casting of the metal, but the present invention is not limited to this embodiment, and the present invention is also effective, when the case sections are formed by injection molding of a resin (a hard resin). In this case, the enlarged-width portions 11 and 12 are formed by using the draft angle of the forming mold.

Furthermore, when the heating device 1 of the present invention is incorporated in the air conditioning device for a vehicle such as the hybrid car or the electric car, improvement of performances of a cooling water circuit, a freezing circuit, an air conditioning device provided with these circuits and the vehicle on which the device is mounted can be achieved, but needless to say, the heating device 1 can be utilized as a heat source of another use application except the air conditioning device for the vehicle.

DESCRIPTION OF REFERENCE NUMERALS

1: heating device
2: case
3: flow path
4: electric heating wire heater (heating element)
6: first case section
7: second case section
8: gasket
11 and 12: enlarged-width portion
13: inflow port
14: outflow port
X1 and X2: draft angle

The invention claimed is:
1. A heating device,
wherein the heating device is constituted of a case including therein a flow path through which a heat medium flows, and heating elements arranged in the flow path of this case to heat the heat medium, and
wherein the case is constituted of a first case section and a second case section each of which has at least one opened surface and which are connected to each other in a state where respective openings are made to abut on each other,
wherein the respective case sections are formed by casting of a metal or injection molding of a resin,
wherein each of the case sections has a draft angle of a casting mold or a forming mold enlarged toward the opening, and enlarged-width portions of the flow path are formed by using the respective draft angles in the state where the openings of the respective case sections are made to abut on each other, and wherein an inflow port and an outflow port of the heat medium are arranged side by side in case, and the inflow port and the outflow port face the enlarged-width portions.

2. The heating device according to claim 1,
wherein the heating elements are arranged along a space between both the case sections.

3. The heating device according to claim 1,
wherein the heat medium is a cooling water, an antifreezing solution, or an LLC for use in a vehicle air conditioning device of a hybrid car or an electric car.

4. The heating device according to claim 1,
wherein the heat medium is an antifreezing solution which flows through a heating circuit.

5. The heating device according to claim 1,
wherein the heating elements are arranged along a space between both the case sections.

6. The heating device according to claim 5,
wherein the heat medium is a cooling water, an antifreezing solution, or an LLC for use in a vehicle air conditioning device of a hybrid car or an electric car.

7. The heating device according to claim 5,
wherein the heat medium is an antifreezing solution which flows through a heating circuit.

8. A method for manufacturing a heating device constituted of a case including therein a flow path through which a heat medium flows, and heating elements arranged in the flow path of the case to heat the heat medium, comprising:

forming, by casting of a metal or injection molding of a resin, a first case section and a second case section each of which has at least one opened surface and has a draft angle of a casting mold or a forming mold toward an opening;

connecting the respective case sections in a state where the openings are made to abut on each other, to form the case, and forming enlarged-width portions of the flow path by use of the draft angles of the case sections, respectively;

arranging an inflow port and an outflow port of the heat medium side by side in the case; and arranging the inflow port and the outflow port to face the enlarged-width portions.

* * * * *